US006990141B1

(12) United States Patent
Iwasaki

(10) Patent No.: US 6,990,141 B1
(45) Date of Patent: Jan. 24, 2006

(54) CORRELATOR

(75) Inventor: Motoya Iwasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 193 days.

(21) Appl. No.: 10/088,553

(22) PCT Filed: Sep. 19, 2000

(86) PCT No.: PCT/JP00/06390

§ 371 (c)(1),
(2), (4) Date: Mar. 19, 2002

(87) PCT Pub. No.: WO01/22608

PCT Pub. Date: Mar. 29, 2001

(30) Foreign Application Priority Data

Sep. 20, 1999 (JP) ................................ 11-265040

(51) Int. Cl.
*H04B 1/707* (2006.01)
(52) U.S. Cl. ...................................... 375/150; 375/343
(58) Field of Classification Search ................ 375/142, 375/143, 145, 149, 150, 152, 343, 367, 365, 375/368; 708/422, 425; 370/335, 342, 441
See application file for complete search history.

(56) References Cited

U.S. PATENT DOCUMENTS

| 4,943,975 A | * | 7/1990 | Kurihara et al. ............ 375/150 |
| 5,627,855 A | | 5/1997 | Davidovici |
| 5,715,276 A | | 2/1998 | Tran et al. |
| 5,844,935 A | * | 12/1998 | Shoji .......................... 375/150 |
| 5,894,494 A | * | 4/1999 | Davidovici ................. 375/150 |
| 6,393,049 B1 | * | 5/2002 | Davidovici et al. ......... 375/142 |
| 6,539,047 B1 | * | 3/2003 | Moon .......................... 375/135 |

FOREIGN PATENT DOCUMENTS

| JP | 8-88587 | 4/1996 |
| JP | 10-178334 | 6/1998 |
| JP | 2850959 | 11/1998 |
| JP | 2000-196498 | 7/2000 |

OTHER PUBLICATIONS

European Search Report dated Jan. 30, 2003.
International Search Report (PCT Form 210) dated Dec. 19, 2000.
International Preliminary Examination Report (PCT Form 409) dated May 10, 2001, with English translation.
Written Opinion (PCT Form 408) dated Feb. 20, 2001.
Transmittal Letter (PCT Form 416) dated May 22, 2001.

* cited by examiner

*Primary Examiner*—Betsy L. Deppe
(74) *Attorney, Agent, or Firm*—McGinn IP Law Group, PLLC

(57) ABSTRACT

A correlator which detects correlation for data having a certain length includes a plurality of sub-correlators, each of the sub-correlators having a length equal to a divisor of the certain length and each of the sub-correlators having such a length that a product of all lengths of the sub-correlators is equal to the certain length. A correlation value output from one of the sub-correlators is input into a sub-correlator located immediately downstream of one of the sub-correlators.

33 Claims, 8 Drawing Sheets

CORRELATOR

BACKGROUND OF THE INVENTION

1. Field of the Invention

The invention relates to a correlator, and more particularly to a correlator suitable to a CDMA type receiver.

2. Description of the Related Art

As is known, in spread spectrum system, a signal is modulated by a transmitter, spectrum-spread through the use of pseudorandom noise code, and then, transmitted. A receiver inverse-spreads a received signal through the use of pseudorandom noise code which is identical with the pseudorandom noise code (PN) having been used by a transmitter for spread, in order to demodulate the received spectrum-spread signal.

In these days, CDMA (Code Division Multiple Access) communication system in which spread-spectrum type pseudorandom noise code is assigned to each communication is expected as a standard radio-communication system for a mobile terminal in a mobile communication system.

In the CDMA communication system, for instance, user data spread with pseudorandom noise code inherent to each of users are synthesized in the same frequency band, and then, is transmitted, and a receiver extracts desired data through the use of pseudorandom noise code of a user who the receiver wants to make communication.

The CDMA communication system has advantages that it presents a high efficiency at which spectrum is used, it has a high resistance to multi-pass, communication can be kept highly in secret, and so on.

In the CDMA communication system, it is necessary for a receiver unit to make synchronization in timing with pseudorandom noise code included in a signal. That is, both timing at which pseudorandom noise code series occur in a received signal and timing at which pseudorandom noise code series prepared by a receiver occur are estimated with accuracy of one chip or smaller, and a pseudorandom noise code series generator is made to start its operation at the estimated timing, that is, synchronization capture is carried out.

In a direct spread (DS) system, a received signal is missed, if a synchronization position is deviated even slightly. Hence, it is necessary for a receiver to carry out synchronous trace in which a received signal having been successfully captured is monitored in order to prevent pseudorandom noise code series from deviating with respect to time.

To this end, a transmitter inserts a fixed pattern (which is a pattern for making synchronization, and is also called "pilot symbol") determined in advance as a synchronization signal, into a signal, and then, transmits the signal. A receiver calculates correlation between a received signal and a fixed pattern for detecting synchronization. Thus, detection of a received signal and timing synchronization control are accomplished.

A direct spread (DS) type spectrum spread communication device is disclosed in Japanese Patent No. 2850959 (B2), for instance.

The conventional direct spread type spread communication device disclosed in the Japanese Patent operates as follows.

A spread spectrum signal having been received through an antenna is converted into a base-band signal in a local oscillator and a low-pass filter both constituting a signal converter. The base-band signal is sampled in a sampling and holding circuit, for instance, by every ½ chip. The thus sampled signal is transmitted to a correlator comprised of a matched filter. The correlator multiplies one symbol of pseudorandom noise code in the received signal by one symbol of pseudorandom noise code prepared in advance in each of chips, calculates a total sum of the products, and transmits the sum to a synchronization detector.

FIG. 8 illustrates an example of a correlator which detects correlation between a sampling signal and pseudorandom noise code. The correlator is comprised of a shift register $301$, a coefficient generator $302$, multipliers $303_1$ to $303_4$, and an adder $304$.

As illustrated in FIG. 8, a spread spectrum signal (input signal) $300$ having been converted into a base-band signal is successively stored into the shift register $301$ chip by chip.

The coefficient generator $302$ generates pseudorandom noise code series. The spread spectrum signal stored in the shift register $301$ and the pseudorandom noise code series are multiplied by each other chip by chip in each of the multipliers $303_1$ to $303_4$. The products are transmitted to the adder $304$ from the multipliers $303_1$ to $303_4$, and the adder $304$ calculates a total sum of the products. The sum is transmitted as an output signal $305$ from the adder $304$.

When the pseudorandom noise code series and the received spread spectrum signal are coincident in timing with each other, the output signal $305$ transmitted from the adder $304$ is in maximum, or makes a matched pulse. The matched pulse is detected by a matched pulse detecting circuit (peak detecting circuit, not illustrated) and a synchronization detector (not illustrated), and inverse-spread demodulation is carried out based on the thus obtained synchronization data.

The above-mentioned Japanese Patent No. 2850959 also discloses a modulator for capturing synchronization in spread spectrum communication, including a synchronization circuit. The synchronization circuit includes a symbol integrator. The symbol integrator inverse-modulates a correlation value, based on either a theoretical value of a symbol, corresponding to a correlation value transmitted from a correlator, or demodulated judgment of an unknown symbol, adds a plurality of symbols to one another to calculate added power of the symbols, to thereby calculate power.

In the CDMA communication system, a signal having been modulated in spread spectrum would have a broad band, and hence, would have a quite low power spectrum density. Accordingly, a signal-to-noise (S/N) ratio is quite small at a front end of a receiver. In other words, since an input signal would have a quite small S/N ratio in equivalence of a chip rate, it would be necessary for a receiver to have a fixed pattern as a pattern for establishing synchronization, which fixed pattern is significantly long with respect to a chip, in order to establish accurate timing synchronization. Hence, a receiver has to include a large correlator as a circuit for capturing synchronization.

For instance, if the correlator illustrated in FIG. 8 were designed to be longer, the shift register $301$ and the adder $304$ would be increased in size, and the number of multipliers $303_1$ to $303_4$ would be increased. As a result, the correlator would consume much power, resulting in increasing difficulty in saving power consumption and fabrication in lower cost in a mobile terminal device such as a CDMA cellular phone.

For instance, if a correlator is designed to receive a fixed pattern having a code length N, comprised of signals obtained by spreading a fixed symbol having a K symbol length at a spreading ratio of M chip/symbol, the correlator would be constructed to have a length of M×K chip.

In addition, if the correlator illustrated in FIG. 8 were designed to be longer, the shift register 301 would have to be constructed longer, resulting in that calculation of a correlation value would take longer time, and hence, it would take longer time until synchronization capture is accomplished.

FIG. 7 illustrates another conventional correlator. The correlator illustrated in FIG. 7 is comprised of a multiplier 201 which receives an input signal 200 and a spread coefficient Ci, and multiplies them by each other, an adding circuit 202, and a latch circuit 203.

The multiplier 201 multiplies the received input signal 200 and the spread coefficient Ci by each other, and transmits the resultant product to the adding circuit 202 through its one input terminal. The adding circuit 202 receives the previous accumulated value (an initial value thereof is equal to zero) through other input terminal thereof, and adds the product and the previous accumulated value to each other. The resultant sum is latched in the latch circuit 203, and is fed back to the adding circuit 202 through the other input terminal. The adding circuit 202 adds the fed-back sum and next sum to each other.

The conventional correlator illustrated in FIG. 7 could have the smaller number of multipliers than that of the parallel type correlator illustrated in FIG. 8. That is, though the correlator illustrated in FIG. 7 could have only one multiplier, the correlator would take longer time to calculate a correlation value than that of the correlator illustrated in FIG. 8.

Specifically, for instance, if correlation having a length N is detected by means of the conventional correlator illustrated in FIG. 7, multiplication is carried out N times and addition of the resultant products is carried out once in order to output a correlation value. Accordingly, a time necessary for obtaining a correlation value increases in proportion to the length N, and hence, it would take much time to accomplish synchronization capture.

In order to accomplish smaller power consumption and lower costs in a mobile terminal device such as a cellular phone, it would be necessary to simplify a circuit structure of the correlator to thereby reduce hardware in size. In addition, it would be also necessary to operate the correlator at a higher rate.

However, the conventional correlators illustrated in FIGS. 7 and 8 cannot meet such requirements as mentioned above.

In view of the above-mentioned problems, it is an object of the present invention to provide a correlator to be used in a receiver in CDMA communication system which correlator is capable of significantly reducing a circuit size.

It is also an object of the present invention to provide a correlator which can prevent an increase in a circuit size, and is adaptive to a plurality of fixed patterns used for establishing synchronization.

SUMMARY OF THE INVENTION

In order to accomplish the above-mentioned objects, there is provided a correlator which detects correlation for data having a certain length, wherein the correlator is comprised of a plurality of sub-correlators, each of the sub-correlators has a length equal to a divisor of the certain length, each of the sub-correlators has such a length that a product of all length of the sub-correlators is equal to the certain length, and a correlation value output from one of the sub-correlators is input into a sub-correlator located immediately downstream of the one of the sub-correlators.

There is further provided a correlator which detects correlation for data having a certain length, wherein the correlator is comprised of a plurality of sub-correlators, each of the sub-correlators has a length equal to a divisor of the certain length, each of the sub-correlators has such a length that a product of all length of the sub-correlators is equal to the certain length, each of the sub-correlators receives both an input signal and a coefficient row used for detecting correlation with the input signal, and outputs a first correlation value, and a sub-correlator located immediately downstream of the each of the sub-correlators receives both the first correlation value and a coefficient row used for detecting correlation with the first correlation value, and outputs a second correlation value.

There is further provided a correlator which detects correlation for data having a certain length N (N=M×K, M and K are integers greater than 1), including a first sub-correlator having a length M and a second sub-correlator having a length K, and wherein the second-stage correlator receives K correlation values output from the first-stage correlator, and detects correlation.

There is further provided a correlator which detects correlation for data having a certain length N (N=M×K, M and K are integers greater than 1), including a first-stage correlator having a length M and a second-stage correlator having a length K, and wherein the first-stage correlator receives both an input signal and a coefficient row used for detecting correlation with the input signal, and outputs K first correlation values, and the second-stage correlator receives both the first correlation values and a coefficient row used for detecting correlation with the first correlation values.

There is further provided a correlator which detects correlation for data having a certain length N (N=N1×N2×---×Nm, N1 to Nm are integers greater than 1, m is an integer equal to or greater than 3), including m sub-correlators have lengths of N1 to Nm, respectively, a (k+1)-th sub-correlator in the m sub-correlators receives $N_{(k+1)}$ (k is an integer equal to or greater than 1, but equal to or smaller than (m−1)) correlation values transmitted from a k-th sub-correlator, and detects correlation.

There is further provided a correlator which detects correlation for data having a certain length N (N=N1×N2×---×Nm, N1 to Nm are integers greater than 1, m is an integer equal to or greater than 3), including m sub-correlators have lengths of N1 to Nm, respectively, and wherein a first sub-correlator having a length of N1 receives both an input signal and a coefficient row used for detecting correlation with the input signal, and outputs N2 first correlation values, and a (k+1)-th sub-correlator having a length of $N_{(k+1)}$ (k is an integer equal to or greater than 1, but equal to or smaller than (m−1)) receives both $N_{(k+1)}$ correlation values transmitted from a k-th sub-correlator, and a coefficient row used for detecting correlation with the $N_{(k+1)}$ correlation values, and outputs a (k+1)-th correlation value.

There is further provided a correlator which receives an input signal including a fixed pattern formed by spreading a predetermined number of symbols constituting a fixed word, with pseudorandom noise code, and which is comprised of a first sub-correlator and a second sub-correlator, including a first sub-correlator and a second sub-correlator, and wherein the first sub-correlator detects correlation between the input signal and the pseudorandom noise code for one symbol length, and the second sub-correlator detects correlation detects correlation between a correlation value output from the first sub-correlator and the fixed word for the predetermined number of symbols.

For instance, the correlator may be designed to include the first sub-correlator by one and the second sub-correlators by the number determined in accordance with types of the fixed word.

It is preferable that the correlator further includes maximum detecting means which receives an output transmitted from the second sub-correlator. The maximum detecting means outputs a maximum signal for informing synchronous detection when a correlation value transmitted from each of the second sub-correlators is in maximum.

There is further provided a correlator including a first sub-correlator which receives a fixed pattern having a code length N (N=M×K), as an input signal comprised of signals obtained by spreading a fixed word having a length of K symbols (K is a predetermined positive integer), at a rate of M chips/symbol (M is a predetermined positive integer), and detects a correlation value between a k-th (0<k<K) symbol having a M chip length, among the fixed pattern, and pseudorandom noise code Sm (m is an integer defined as k×M≦m<(k+1)×M), and a second sub-correlator which receives data corresponding to K symbols, about a correlation value output from the first sub-correlator, and outputs a correlation value between the data and the fixed word.

There is further provided a correlator including a first sub-correlator which receives a fixed pattern having a code length N (N=M×K), as an input signal comprised of signals obtained by spreading a fixed word having a length of K symbols (K is a predetermined positive integer), at a rate of M chips/symbol (M is a predetermined positive integer), and detects a correlation value between a k-th (0≦k<K) symbol having a M chip length, among the fixed pattern, and pseudorandom noise code Sm (m is an integer defined as k×M≦m<(k+1)×M), a memory which stores a predetermined number of correlation values per a symbol which correlation values are transmitted from the first sub-correlator and are different in a phase from one another with respect to the input signal, and which stores correlation values totally corresponding to K symbols, and a second sub-correlator which receives data corresponding to K symbols, read out of the memory every predetermined number, and outputs a correlation value between the data and the fixed word.

There is further provided a correlator which receives a fixed pattern having a code length N (N=M×K) which fixed pattern is obtained by spreading a fixed word having a length of K symbols (K is a predetermined positive integer), at a rate of M chips/symbol (M is a predetermined positive integer), including a first sub-correlator which receives the fixed pattern as an input signal, and detects a correlation value between a k-th (0≦k<K) symbol having a M chip length, among the fixed pattern, and pseudorandom noise code Sm (m is an integer defined as k×M≦m<(k1)×M), a memory which stores a predetermined number (L) of correlation values per a symbol which correlation values are transmitted from the first sub-correlator and are different in a phase from one another with respect to the input signal, and which stores L×K correlation values totally corresponding to K symbols, a reading-address controller which outputs a reading-address used for reading data corresponding to K symbols out of the memory by every L correlation values, and a second sub-correlator which receives the data corresponding to K symbols, read out of the memory by every L correlation values, and outputs a correlation value between the data and the fixed word.

The correlator may be designed to further include a writing-address controller which outputs a writing-address, wherein a correlation value output from the first sub-correlator is written into an address in the memory which address is designated by the writing-address controller.

The correlator may be designed to include the first sub-correlator by one and the second sub-correlators by the number determined in accordance with types of the fixed word.

It is preferable that the correlator further includes maximum detecting means which receives an output transmitted from the second sub-correlator. The maximum detecting means outputs a maximum signal for informing synchronous detection when a correlation value transmitted from each of the second sub-correlators is in maximum.

It is preferable that the correlator further includes a code switch which switches the pseudorandom noise code used for detecting correlation with the input signal.

For instance, the correlation values may be deviated from one another by 1 chip or ½ chip, for instance.

It is preferable that the memory is comprised of a dual port type random access memory.

The correlator may include a comparator in place of the second sub-correlator which comparator compares K correlation values transmitted from the first sub-correlator to the fixed word to check whether they are coincident with each other.

There is further provided a correlator which detects correlation for data having a certain length N, including a first sub-correlator having a length M which is a divisor of the N, and a second sub-correlator having a length K which is a divisor of the N, and wherein the first sub-correlator detects correlation between input data having a length of M and data having a length M and prepared for detecting correlation with the input data having a length M, and the second sub-correlator detects K correlation values output from the first sub-correlator and K number of data prepared for detecting correlation with correlation values transmitted from the first sub-correlator.

Any one of the above-mentioned correlators may be applied to a CDMA (Code Division Multiple Access) type communication device.

There is further provided a spread spectrum type communication device including a correlator used for carrying out synchronization capture, the correlator including a first sub-correlator which detects correlation between an input signal and pseudorandom noise code for inverse-spreading the input signal having been spectrum-spread, and a second sub-correlator which detects correlation between a predetermined number of correlation outputs transmitted from the first sub-correlator, and a synchronization pattern.

There is further provided a spread spectrum type communication device including a correlator used for carrying out synchronization capture, the correlator including a first sub-correlator which detects correlation between an input signal and pseudorandom noise code for inverse-spreading the input signal having been spectrum-spread, and a comparator which compares a predetermined number of correlation outputs transmitted from the first sub-correlator, to a synchronization pattern for checking whether they are coincident with each other.

The advantages obtained by the aforementioned present invention will be described hereinbelow.

As mentioned above, the correlator in accordance with the present invention is designed to include a sub-correlator having a length of M chip and a sub-correlator having a length of K symbol. This structure provides advantages that a circuit size can be reduced, and the correlator can calculate a correlation value equivalently to a correlator having a length N chip (N=M×K).

Furthermore, the present invention provides an advantage that the second sub-correlators by the number equal to the number of kinds of fixed patterns can calculate correlation values for a plurality of fixed patterns with an increase in a circuit size being prevented.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1:
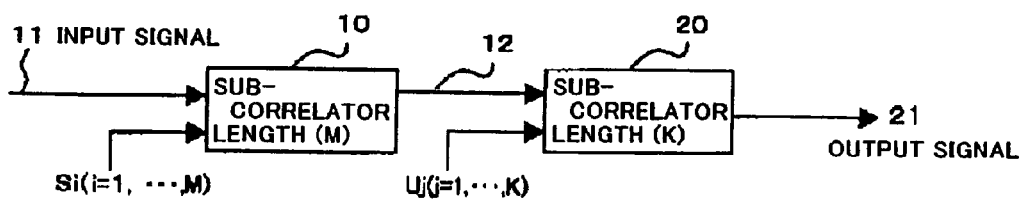
FIG. 1($a$) and FIG. 1($b$) illustrate an embodiment of the present invention, and FIG. 1($c$) illustrates a conventional correlator.
Figure 1:
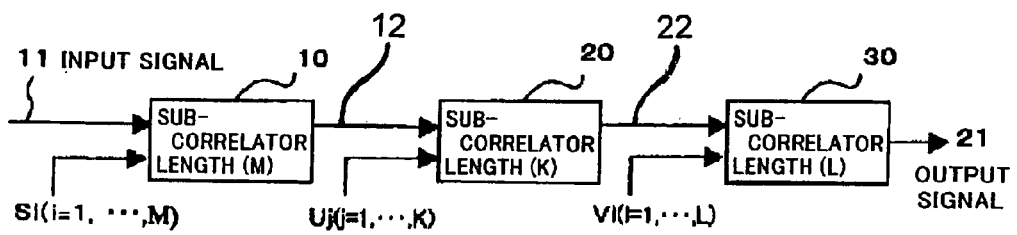
Figure 1:
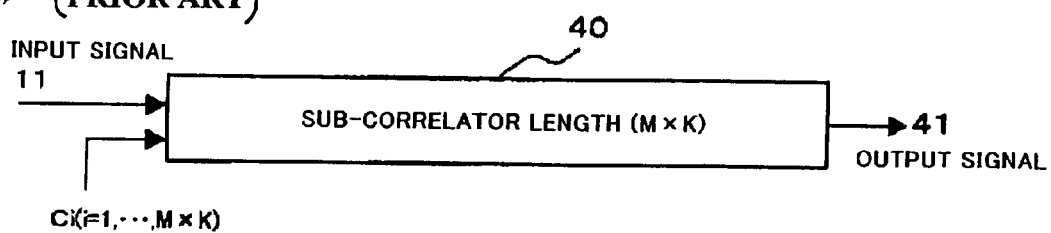

Preferred embodiments in accordance with the present invention will be explained hereinbelow. FIG. 1 shows a structural concept of the present invention. FIG. 1($a$) and FIG. 1($b$) illustrate a correlator in accordance with the present invention, and FIG. 1($c$) illustrates a conventional correlator to be compared to the correlator in accordance with the present invention.

FIG. 1($a$) illustrates a correlator in accordance with the first embodiment of the present invention. The correlator in accordance with the first embodiment detects correlation for a certain length N (N=M×K), and is comprised of a first sub-correlator 10 having a length M, and a second sub-correlator 20 having a length K, which receives a correlation value 12 transmitted from the first sub-correlator 10 and is connected to the first sub-correlator 10 in cascade.

The first sub-correlator 10 receives an input signal 11 and coefficient series Si (i=1, 2, - - - , M) having a length M, used for detecting correlation with the input signal 11, detects correlation (multiplication and addition) between them, and outputs the correlation value 12. The second sub-correlator 20 receives the correlation value 12 transmitted from the first sub-correlator 10, and coefficient series Ui (i=1, 2, - - - , K) used for detecting correlation with K output series of the correlation value 12, detects correlation between them, and outputs a correlation value 21.

FIG. 1($c$) illustrates a conventional correlator 40 used for detecting correlation for a certain length N (N=M×K) similarly to the correlator in accordance with the first embodiment.

In the correlator in accordance with the first embodiment, a total length of the first and second sub-correlators 10 and 20 is equal to (M+K). Hence, the correlator in accordance with the first embodiment can significantly reduce a circuit size in comparison with the conventional correlator having a length of (M×K), illustrated in FIG. 1($c$).

In addition, since a total length of the first and second sub-correlators 10 and 20 is equal to (M+K), it would be possible to increase an operation rate in the correlator.

Figure 8:
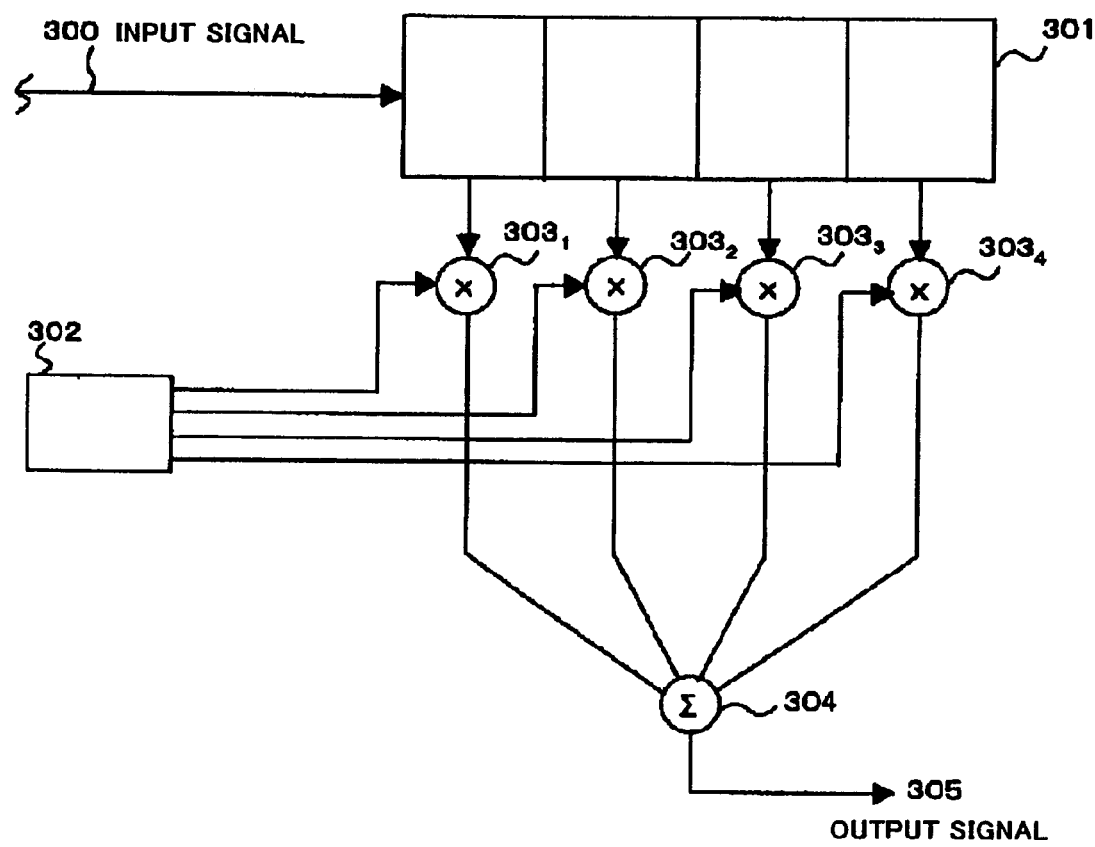
FIG. 8 is a block diagram of another conventional correlator.

For instance, if the correlator illustrated in FIG. 8 were comprised of the first sub-correlator 10 and the second sub-correlator 20 both illustrated in FIG. 1($a$), a time necessary for calculation of a correlation value is in proportion to not (M×K), but (M+K).

The correlator in accordance with the first embodiment, illustrated in FIG. 1($a$) is not to be limited to a two sub-correlator structure. The correlator may be designed to have a three sub-correlator structure, for instance, as illustrated in FIG. 1($b$).

The correlator illustrated in FIG. 1($b$) detects correlation for a certain length N (N=M×K×L), and is comprised of a first sub-correlator 10 having a length M, a second sub-correlator 20 having a length K, which receives a correlation value 12 transmitted from the first sub-correlator 10, and a third sub-correlator 30 having a length L, which receives a correlation value 22 transmitted from the second sub-correlator 20. The first to third sub-correlators 10, 20 and 30 are connected to one another in cascade.

The first sub-correlator 10 receives an input signal 11 and coefficient series Si (i=1, 2, - - - , M) having a length M, used for detecting correlation with the input signal 11, detects correlation (multiplication and addition) between them, and outputs the correlation value 12. The second sub-correlator 20 receives the correlation value 12 transmitted from the first sub-correlator 10, and coefficient series Ui (i=1, 2, - - - , K) used for detecting correlation with K output series of the correlation value 12, detects correlation between them, and outputs a correlation value 22. The third sub-correlator 30 receives the correlation value 22 transmitted from the second sub-correlator 20, and coefficient series Vi (i=1, 2, - - - , L) used for detecting correlation with L output series of the correlation value 22, detects correlation between them, and outputs a correlation value 21.

In the correlator illustrated in FIG. 1($b$), a total length of the first to third sub-correlators 10, 20 and 30 is equal to (M+K+L). Hence, the correlator can significantly reduce a circuit size in comparison with a conventional correlator (length M×K×L) corresponding to the correlator illustrated in FIG. 1($c$). In addition, it is possible to increase an operation rate in calculation of a correlation value.

As will be readily understood for those skilled in the art in view of the correlator illustrated in FIG. 1($b$), the correlator may be designed to be comprised of four, five or more sub-correlators.

For instance, a correlator to be used for detecting correlation for a length S (S=$S_1$×$S_2$× - - - ×$S_R$: R is a positive integer equal to or greater than four) may be comprised of R sub-correlators having lengths $S_1$, $S_2$, - - - $S_R$, respectively, and connected to one another in cascade. Each of the sub-correlators receives a correlation value transmitted from a immediately upstream sub-correlator, and coefficient series used for detecting correlation with a received input signal, and outputs a correlation value.

In accordance with the embodiment illustrated in FIG. 1($b$), a correlator which detects correlation for a length of 100 chips may be comprised of three sub-correlators each having a length of 10 chips, connected to one another in cascade. In the correlator, a total length of the three sub-correlators is just equal to 30 chips, ensuring significant reduction in a circuit size in comparison with the conventional correlator 40 (see FIG. 1(*c*) having a length of 1000 chips.

Hereinbelow is explained an embodiment of a correlator to which the correlator in accordance with the first embodiment, illustrated in FIG. 1(*a*), is applied. The correlator mentioned hereinbelow is used for capturing synchronization in a CDMA communication device.

The correlator in accordance with the embodiment described hereinbelow receives a fixed pattern Cn having a length N (N=M×K) which fixed pattern is comprised of signals generated by spreading a fixed word having a length of K symbol (K is a predetermined positive integer) at a spreading ratio (a ratio between symbol period and chip period) of M chip/symbol (M is a predetermined positive integer), and outputs a correlation value. The correlator is comprised of a first sub-correlator 10 and a second sub-correlator 20.

The first sub-correlator 10 has a length of M chips, and outputs a correlation value between a k-th (0≦k≦K−1) symbol among a received fixed pattern and pseudorandom noise code Sm (m is an integer defined as k×M≦m<(k+1)×M).

The second sub-correlator 20 receives data covering K symbol in the correlation value output from the first sub-correlator 10, and outputs a correlation value with a fixed word U0 to U(K−1) having a length K.

Specifically, at first, the first sub-correlator 10 shorter in length than the fixed pattern Cn (n=0, 1, 2, - - - , N−1) calculates a first correlation value, and then, the second sub-correlator 20 having a length K calculates a correlation value with the fixed word.

In accordance with the embodiment, it would be possible to reduce a circuit size. In addition as a result of constructing the correlator shorter, it would be possible to increase an operation speed.

In a typical application, the spreading ratio M is, for instance, in the range of about 10 to about 10000. For instance, assuming that the spreading ratio M is equal to 100, and a fixed word as a frame synchronizing pattern is defined as U0 to U15, that is, the length K is set equal to 16, the conventional correlator 14 illustrated in FIG. 1(*c*) would have a length N calculated as follows:

$N = M \times K = 1600$

In contrast, the correlation illustrated in FIG. 1(*a*) would have a length calculated as follows:

$M + K = 116$

This length is about fourteen times smaller than the length N of the conventional correlator 40 illustrated in FIG. 1(*c*).

Though the correlator illustrated in FIG. 1(*a*) was designed to include one first sub-correlator 10 and one second sub-correlator 20, the correlator may be designed to include one common first sub-correlator 10 and a plurality of second sub-correlators 20. This correlator would prevent an increase in a circuit size, and could receive a plurality of fixed patterns.

For instance, a correlator including one first sub-correlator having a length of M and R second sub-correlators each having a length of K would have a length N calculated as follows:

$N = M + K \times R$

On the other hand, R correlators each having a length N (N=M×K) would have a total length calculated as follows:

$M \times K \times R$

As is obvious, the correlator in accordance with the above-mentioned embodiment makes it possible to significantly reduce a circuit size.

Hereinbelow are explained correlators in accordance with other embodiments of the present invention.

Figure 2:
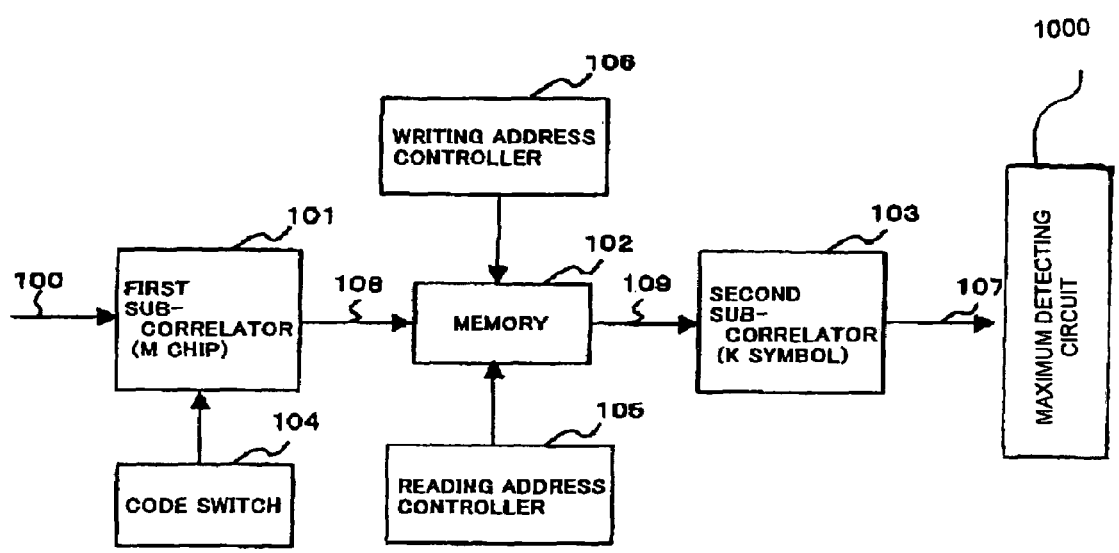
FIG. 2 is a block diagram of a correlator in accordance with an embodiment of the present invention.

FIG. 2 is a block diagram of a correlator in accordance with an embodiment of the present invention.

The correlator in accordance with the embodiment is applied to a synchronization capturing circuit equipped in a receiver in CDMA communication system.

Parts to be formed upstream of the correlator include an antenna through which a radio signal is received, an amplifier which amplifies a signal having been received through the antenna, a mixer which mixes an output signal transmitted from the amplifier and a local signal with each other, and outputs an intermediate frequency (IF) signal, a signal convertor comprised of a low-pass filter, a sampling and holding circuit which samples and holds a base-band signal transmitted from the signal convertor, and so on. Since they are well known to those skilled in the art, they are not explained in detail.

With reference to FIG. 2, the correlator in accordance with the embodiment is comprised of a first sub-correlator 101, a code switch 104 which switches pseudorandom noise code rows to be supplied to the first sub-correlator 101, a memory 102, a reading address controller 105 which controls an address for reading data out of the memory 102, a writing address controller 106 which controls an address for writing data into the memory 102, and a second sub-correlator 103.

A signal having been modulated with pseudorandom noise code is received at an antenna (not illustrated) of a receiver, converted into a base-band signal in the signal convertor, sampled in the sampling and holding circuit, and then, input into the first sub-correlator 101 as an input signal 100.

The first sub-correlator 101 calculates correlation between the input signal 100 having a length of one symbol and pseudorandom noise code, and outputs a correlation value 108.

The code switch 104 switches pseudorandom noise code correlation between which and the input signal 100 is calculated by the first sub-correlator 101.

The writing address controller 106 generates a writing address at which the correlation value 108 transmitted from the first sub-correlator 101 is written into the memory 102.

The reading address controller 105 generates a reading address from which a correlation value 109 to be transmitted to the second sub-correlator 103 is read out of the memory 102.

The correlation value 108 output from the first sub-correlator 101 is written into the memory 102 at the writing address output from the writing address controller 106. A correlation value is read out of the memory 102 from a reading address output from the reading address controller 105, and then, is transmitted to the second sub-correlator 103.

The memory 102 is comprised of, for instance, a dual port RAM in which writing data and reading data are carried out independently of each other at two ports.

The second sub-correlator 103 calculates correlation between the predetermined number of correlation values 109 read out of the memory 102, and a fixed word comprised of the predetermined number of symbols used for detecting synchronization and prepared in advance for detecting correlation with the thus read-out correlation values, and outputs a correlation value 107.

The correlator illustrated in FIG. 2 may be designed to further include a maximum detecting circuit (peak detecting circuit) which receives an output signal transmitted from the second sub-correlator 103.

Hereinbelow is explained an operation of the correlator in accordance with the embodiment, with reference to FIG. 2.

Herein, it is assumed that the input signal 100 input into the first sub-correlator 101 includes a fixed pattern Cn (n is an integer equal to or greater than zero, but equal to or smaller than (N−1)) having a code length N.

The fixed pattern Cn (n=0, 1, 2, - - - , N−1) is comprised of signals generated by spreading a fixed word having a predetermined length of K symbol, with a pseudorandom noise code at a rate of M chip/symbol. This fixed pattern is inserted into a signal as a frame synchronizing pattern, and received at a receiver. The fixed pattern Cn received at a receiver includes noises while it is being transmitted.

The fixed pattern Cn has a code length N (N=K×M).

It is assumed that a k-th symbol in the fixed word having a length of K symbol is expressed as Uk (0≦k≦K−1), and a pseudorandom noise code is expressed as Sn. The fixed pattern Cn (n=kM+m, 0≦m≦M−1) generated by spreading a fixed word Uk with the pseudorandom noise code Sn at a rate of M chip/symbol on the side of a transmitter is expressed by the following equation (1).

$$C_{(kM+m)} = U_k \times S_{(kM+m)} \quad (1)$$

The receiver including the correlator in accordance with the present embodiment receives the fixed pattern Cn (n=0, 1, 2, - - - , N−1) having been spread with the pseudorandom noise code Sn on the transmitter's side, and calculates a correlation value by means of a two-stage correlator comprised of the first sub-correlator 101 and the second sub-correlator 103.

It is assumed that in a signal received in the receiver, a timing at which the fixed pattern Cn (n=0, 1, 2, - - - , N−1) is inserted is within a predetermined range.

The first sub-correlator 101 has a length of M chip. The first sub-correlator 101 outputs correlation between the pseudorandom noise code Sm (k×M≦m<(k+1)×M) and M samples of the input signal 100 by which a k-th symbol Uk in the fixed word is received among the fixed pattern Cn (n=0, 1, 2, - - - , N−1).

When the receiver establishes synchronization with a transmitted signal, a pseudorandom noise code row generated by spreading the fixed pattern Cn (n=0, 1, 2, - - - , N−1) at the side of a transmitter becomes identical with a pseudorandom noise code row of the first sub-correlator 101. As a result, the correlation value 108 transmitted from the first sub-correlator 101 is comprised of the k-th symbol Uk in the fixed symbol to which noises are added.

The correlation value 108 transmitted from the first sub-correlator 101 is stored in the memory 102 at an address designated by the writing address signal output from the writing address controller 106.

The writing address controller 106 includes a counter. The counter makes successive increments starting from a count zero. When the counter counts a maximum address of the memory 102, a count is initialized to zero. A count in the counter is transmitted as the writing address.

It is assumed in the embodiment that a signal received in the receiver has a time band corresponding to L chip periods, that is, an indefinite band as an estimated range of a timing at which the fixed pattern Cn (n=0, 1, 2, - - - , N−1) is to be received.

Figure 4:
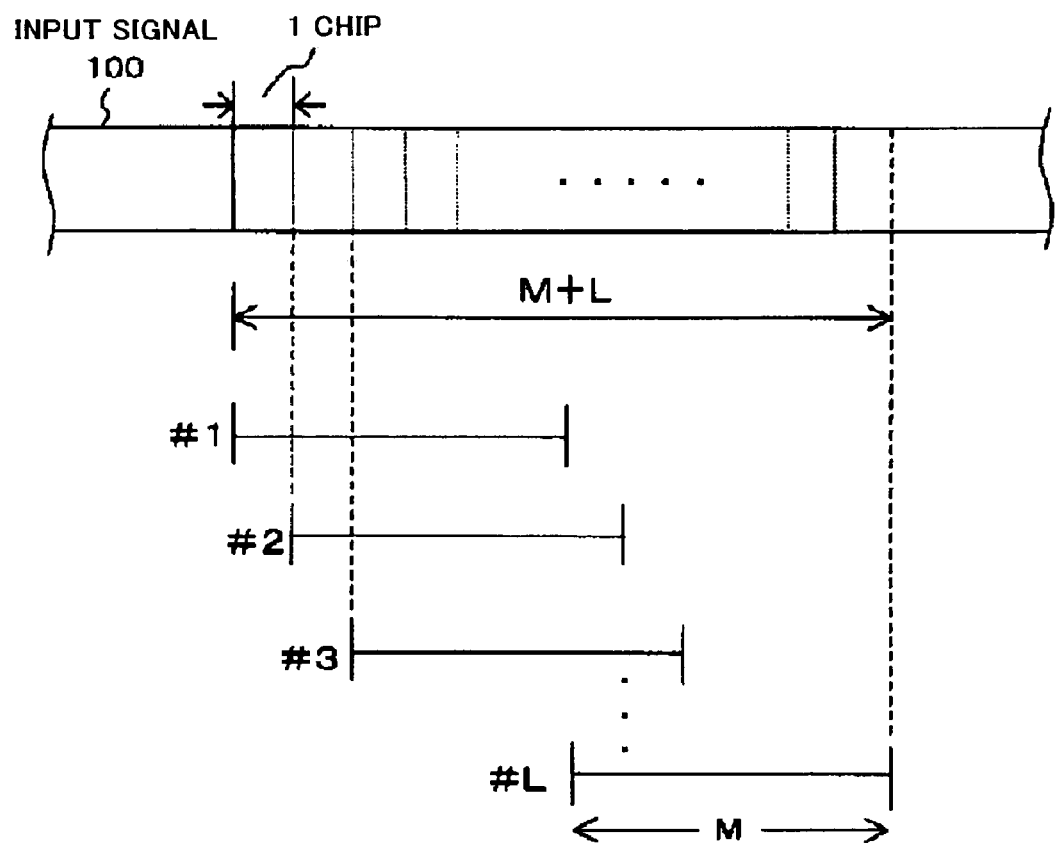
FIG. 4 illustrates L correlation values transmitted from the first sub-correlator in the correlator illustrated in FIG. 2.

FIG. 4 is a timing chart showing deviation in phase among L correlation values transmitted from the first sub-correlator 101.

As illustrated in FIG. 4, a sample row #1 to a sample row #L each having a length M are out of phase by one chip period in the first sub-correlator 101. That is, a starting point (sampling point) of the input signal 100 correlation between which and the pseudorandom noise code is to be detected delays by one chip in the sample rows #1 to #L.

The first sub-correlator 101 successively detects correlation between the pseudorandom noise code and each of the sample rows #1 to #L, and stores L correlation values per a symbol into the memory 102. Accordingly, L×K correlation values are stored into the memory 102 for K symbols.

Though FIG. 4 illustrates an example in which correlation between the pseudorandom noise code and an input signal in L sample rows which are out of phase chip by chip relative to a fixed pattern, the present embodiment is not to be limited to such an example.

For instance, the correlator may be designed to calculate 2L correlation values (time intervals corresponding to 2L chip periods) for input signals out of phase chip by chip, each having a length M, or calculate 2L correlation values for input signals out of phase ½ chip by ½ chip, each having a length M.

The second sub-correlator 103 calculates a correlation value between a fixed word Uk (k=0, 1, 2, - - - , K−1) and data corresponding to K symbols read out of the memory 102 by every L symbols in accordance with the reading addresses output from the reading address controller 105, and outputs the thus calculated correlation value.

Hereinbelow are explained an operation for writing data into the memory 102 from the first sub-correlator 101 and an operation for reading data out of the memory 102, with reference to FIGS. 2 and 3.

Figure 3:
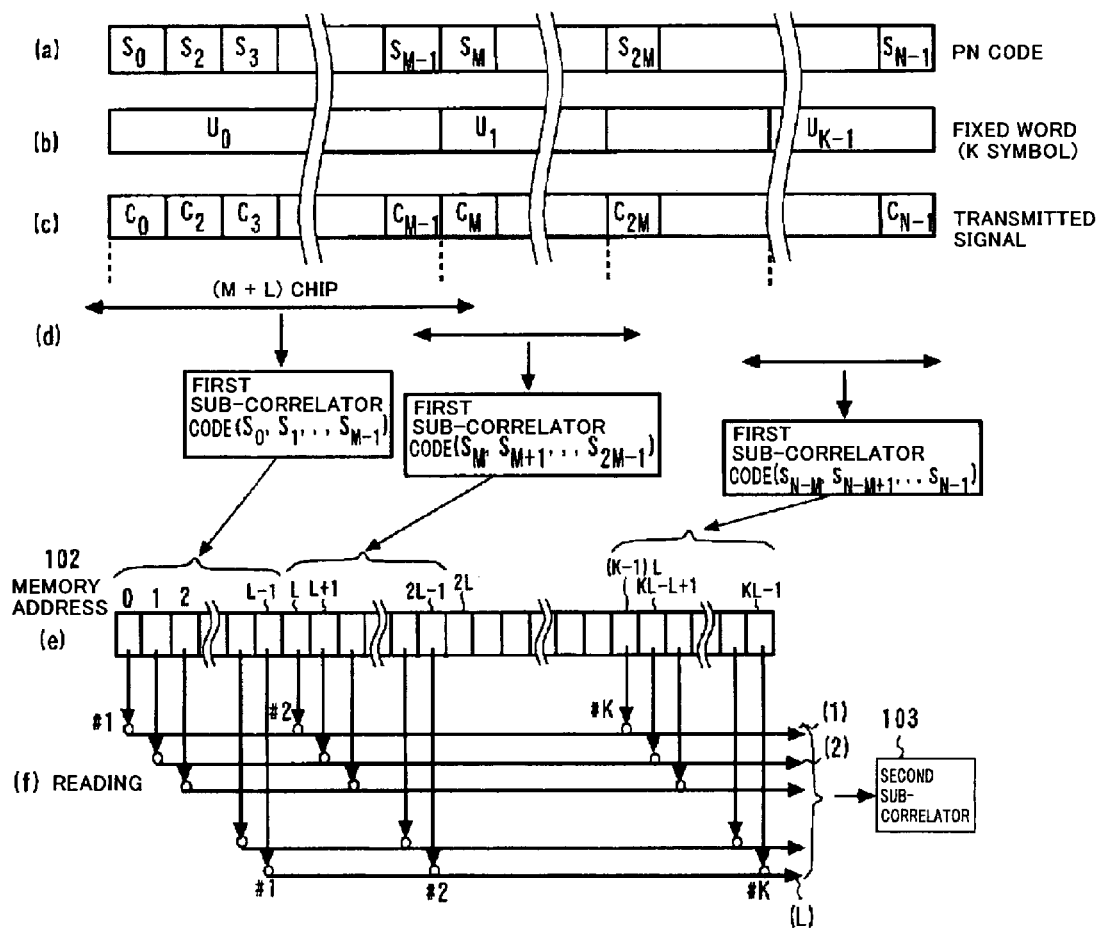
FIG. 3 is a timing chart showing an operation of the correlator illustrated in FIG. 2.

FIG. 3 is a timing chart of an operation for writing data into the memory 102 from the first sub-correlator 101 and an operation for reading data out of the memory 102 in the first sub-correlator 101.

FIG. 3(a) shows pseudorandom noise codes Sn (0≦=n≦N−1), FIG. 3(b) shows fixed words Uk (0≦k≦K−1), and FIG. 3(c) shows fixed patterns Cn (0≦n≦N−1) generated from the pseudorandom noise codes Sn shown in FIG. 3(a) and the fixed words shown in FIG. 3(b), that is, a signal to be transmitted (which is a signal to be received in a receiver, and concurrently, a signal to be supplied to the first sub-correlator 101).

FIG. 3(d) a pseudorandom noise code of the first sub-correlator 101, FIG. 3(e) shows how correlation values are written into the memory 102, and FIG. 3(f) shows how correlation values are read out of the memory 102.

The fixed pattern Cn (see FIG. 3(c)) included in a received signal is expressed as a product of the pseudorandom noise code Sn and the fixed work Uk, as mentioned earlier with reference to the equation (1).

As having been explained with reference to FIG. 4, the first sub-correlator 101 calculates correlation values of the input signal 100 for a time range having a L chip length, in which each of symbols is expected to be received (see FIG. 3(d)). The L correlation values per a symbol transmitted from the first sub-correlator 101 are successively written into the memory 102 (see FIG. 3(e)). A pseudorandom noise code Sm (k×M≦m<(k+1)×M) associated with a position of a symbol is used for a k-th symbol, as a pseudorandom noise code used for detecting correlation.

That is, for a 0-th symbol code ($U_0$) in a fixed word, the pseudorandom noise codes $S_0, S_1, $ - - - , $S_{m-1}$ corresponding to a position of the symbol are used in the first sub-correlator 101, as illustrated in FIG. 3(d). For a first symbol code ($U_1$), the pseudorandom noise codes $S_M$, $S_{M+1}$, - - -, $S_{2M-1}$ corresponding to a position of the symbol are used. Similarly, for a K-th symbol code ($U_K$), the pseudorandom noise codes $S_{KM}$, $S_{KM+1}$, - - -, $S_{KM+M-1}$ corresponding to a position of the symbol are used.

Those pseudorandom noise codes $S_0$, $S_1$, - - -, $S_{M-1}$, $S_M$, $S_{M+1}$, - - -, $S_{2M-1}$, and $S_{KM}$, $S_{KM+1}$, - - -, $S_{KM+M-1}$ are switched by the code switch 104.

As illustrated in FIG. 3(f), the second sub-correlator 103 calculates correlation between K symbol data read out of the memory 102 by every L correlation values and the fixed words Uk (k=0, 1, 2, - - -, K−1), and outputs the calculated correlation.

The reading address controller 105 generates K addresses comprised of an address 0 and addresses having increment of L addresses from the address 0, as a reading address based on which a correlation value is read out of the memory 102.

Then, the correlation values 109 corresponding to K symbols are successively read out of the memory 102 through the use of the addresses transmitted from the reading address controller 105, and then, input into the second sub-correlator 103. The second sub-correlator 103 calculates the correlation value 107 between the K correlation values 109 and the fixed words Uk and outputs the thus calculated correlation value 107.

Then, the reading address controller 105 generates K addresses comprised of an address 1 and addresses having increment of L addresses from the address 1. Then, K correlation values read out of the memory with the thus generated addresses being used as reading addresses are input into the second sub-correlator 103.

Hereinafter, similarly to the above-mentioned manner, there are generated K addresses comprised of an address (L−1) and addresses having increment of L addresses.

Specifically, as shown with the numeral (1) in FIG. 3(f), a first group of K correlation values stored in the memory 102 at addresses 0, L, 2L, - - -, (K−1)L are successively read out of the memory 102, and input into the second sub-correlator 103 in the order of being read out of the memory 102. Then, a correlation value between the K correlation values and the fixed words Uk (k=0, 1, 2, - - -, K−1) is calculated.

Then, as shown with the numeral (1), a second group of K correlation values stored in the memory 102 at addresses 1, L+1, 2L+1, - - -, (K−1)L+1 are successively read out of the memory 102, and input into the second sub-correlator 103. Then, a correlation value between the K correlation values and the fixed words Uk (k=0, 1, 2, - - -, K−1) is calculated.

Hereinafter, similarly to the above-mentioned manner, as shown with the numeral (L), a L-th group of K correlation values stored in the memory 102 at addresses L−1, 2L−1, 3L−1, - - -, KL−1(=N−1) are successively read out of the memory 102, and input into the second sub-correlator 103. Then, a correlation value between the K correlation values and the fixed words Uk (k=0, 1, 2, - - -, K−1) is calculated.

As is obvious in view of comparison among the numerals (1), (2) and (L) in FIG. 3(f), a M-th (M is an integer equal to or greater than 1, but equal to or smaller than (L−1)) group of K correlation values and (M+1)-th group of K correlation values are out of phase by one chip.

In the above-mentioned manner, the second sub-correlator 103 calculates correlation between the fixed words Uk (k=0, 1, 2, - - -, K−1) and L groups of K correlation values shown as the numerals (1) to (L), read out of the memory 102 and input into the second sub-correlator 103, which are out of phase from one another, and outputs the correlation as a correlation value 107.

When the K correlation values read out of the memory 102 are identical with the fixed words Uk (k=0, 1, 2, - - -, K−1), the correlation value 107 transmitted from the second sub-correlator 103 is used as a correlation value of the fixed pattern Cn (n=0, 1, 2, - - -, N−1) in the received signal, and is in maximum.

The correlation value 107 transmitted from the second sub-correlator 103 is substantially identical with a correlation value between an input signal and the fixed pattern Cn (n=0, 1, 2, - - -, N−1), calculated by a correlator having a N chip length.

This is because the correlation value is calculated by the process of reading groups (groups shown with the numerals (1) to (L) in FIG. 3(f)) of K correlation values having the same delay time, by every L correlation values, among L×K correlation values calculated every M chips, and detecting correlation between the K correlation values and the fixed words Uk (k=0, 1, 2, - - -, K−1).

Specifically, the K correlation values read out of the memory 102 by every L correlation values among the L×K correlation values, corresponding to K symbols, between pseudorandom noise codes and an input signal having a length M for the fixed pattern Cn (n=0, 1, 2, - - -, N−1) transmitted to the memory 102 from the first sub-correlator 101, correspond to symbols in the fixed words Uk (k=0, 1, 2, - - -, K−1). Hence, correlation between L groups of correlation values which are out of phase from one another and the fixed words Uk (k=0, 1, 2, - - -, K 1) can be detected, based on an output signal transmitted from the second sub-correlator 103 which calculates a correlation value between each group of K correlation values and the fixed words Uk (k=0, 1, 2, - - -, K−1).

This is equivalent to calculating a correlation value between an input signal comprised of the fixed pattern Cn (n=0, 1, 2, - - -, N−1) having a N chip length, and the pseudorandom noise code Sn (n=0, 1, 2, - - -, N−1) having a length N, detecting the fixed pattern Cn (n=0, 1, 2, - - -, N−1), and thereby detecting the fixed words Uk (k=0, 1, 2, - - -, K−1), based on the input signal.

As mentioned so far, the correlator including the first and second sub-correlators 101 and 103, in accordance with the embodiment, acts as a correlator equivalent to a correlator having a length of N=M×K chip.

Figure 5:
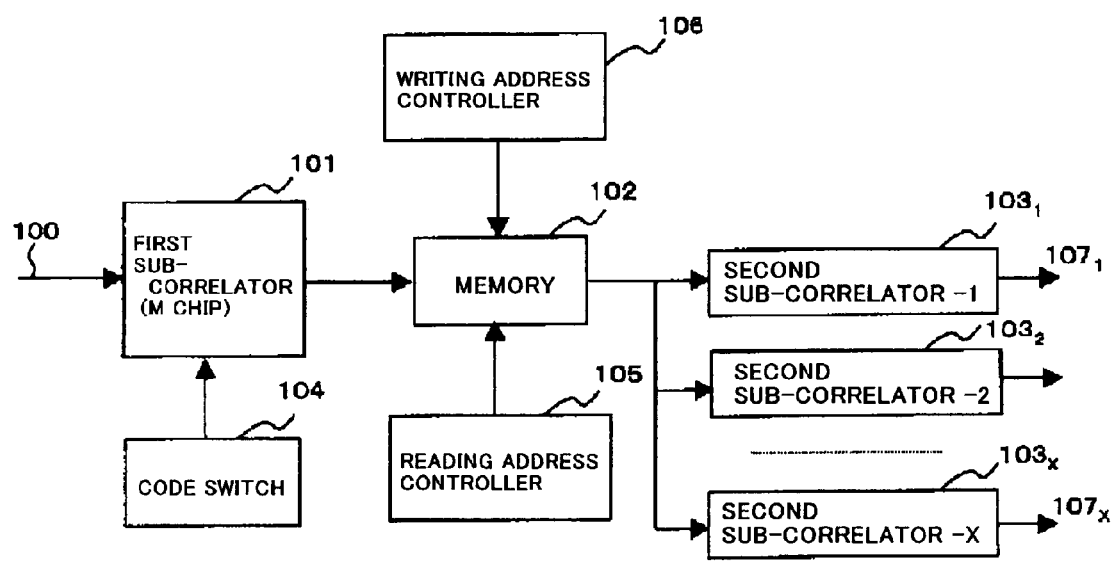
FIG. 5 is a block diagram of a correlator in accordance with another embodiment of the present invention.

Hereinbelow is explained the second embodiment of the present invention. FIG. 5 is a block diagram of a correlator in accordance with the second embodiment of the present invention.

The correlator in accordance with the second embodiment is comprised of a first sub-correlator 101, a code switch 104 which switches pseudorandom noise code rows to be supplied to the first sub-correlator 101, a memory 102, a reading address controller 105 which controls an address for reading data out of the memory 102, a writing address controller 106 which controls an address for writing data into the memory 102, and X second sub-correlators $103_1$ to $103_X$ connected in parallel with one another to the memory 102.

The correlator in accordance with the second embodiment is structurally different from the correlator in accordance with the first embodiment, illustrated in FIG. 2, in including a plurality of second sub-correlators $103_1$ to $103_X$ connected in parallel with the memory 102.

The number X of the second sub-correlators $103_1$ to $103_X$ is equal to the number of kinds of fixed symbols constituting a fixed pattern.

That is, the correlator in accordance with the present embodiment includes the second sub-correlators each having a K symbol length, by the number equal to the number of kinds of fixed symbols, since a pattern comprised of the fixed words Uk (k=0, 1, 2, - - -, K−1) may be equal to a plurality of values. Thus, it would be possible to calculate a correlation value for all fixed patterns.

In order to deal with that a pattern comprised of the fixed words Uk (k 0, 1, 2, - - -, K−1) may be equal to a plurality of values, the conventional correlator had to include sub-correlators each having a length of N chip, by the number equal to kinds of fixed symbols, resulting in an increase in a circuit size.

In contrast, since the correlator in accordance with the above-mentioned second embodiment is designed to include the sub-correlators by the number equal to the number of kinds of a pattern of the fixed words Uk (k=0, 1, 2, K−1), it would be possible to prevent a circuit size from increasing.

The correlator in accordance with the second embodiment, illustrated in FIG. 5, may be designed to further include a maximum detecting circuit 1000 (e.g., a peak detecting circuit, maximum detecting means, etc.) as illustrated in FIG. 2, which receives output signals transmitted from the second sub-correlators $103_1$ to $103_x$. When a maximum correlation value is transmitted from each of the second sub-correlators $103_1$ to $103_x$, the maximum detecting circuit 1000 transmits a maximum signal.

Hereinbelow are explained structures of the first sub-correlator 101 and the second sub-correlator 103 both constituting the correlators in accordance with the above-mentioned embodiments.

The first sub-correlator 101 may be comprised of any correlator, if it had a function of outputting a correlation value between an input signal and a pseudorandom noise code. In compliance with required performances, any correlator may be used as the first sub-correlator 101.

For instance, the conventional correlator illustrated in FIG. 8 may be used as the first sub-correlator 101.

That is, the first sub-correlator 101 may be designed to include a coefficient generator (see FIG. 8) which generates a pseudorandom noise code row selected by the code switch 104, a shift register 301 having a length M, which shifts an input signal chip by chip, M multipliers $303_1$ to $303_M$ each of which multiplies an output transmitted from the shift register 301 by a pseudorandom noise code, an adder 304 which adds outputs transmitted from the M multipliers, to one another.

Figure 7:
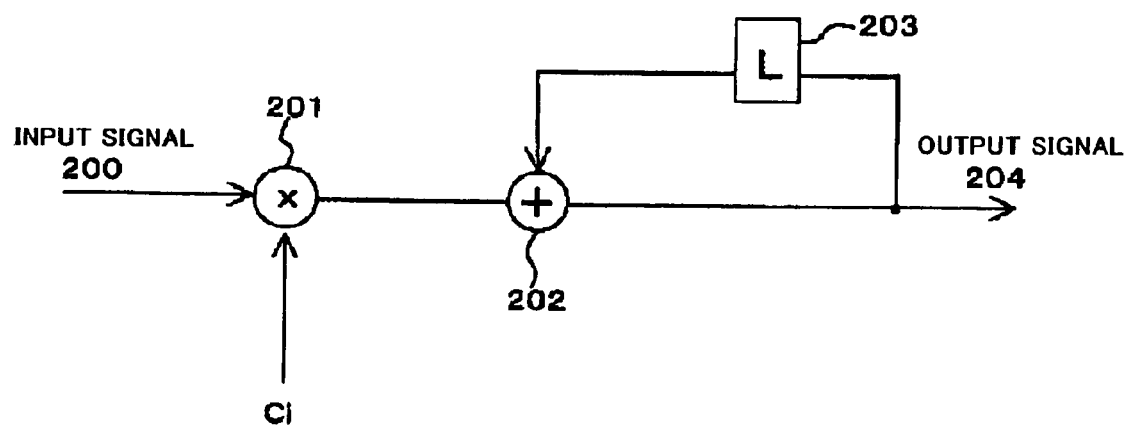
FIG. 7 is a block diagram of a conventional correlator.

As an alternative, the first sub-correlator 101 may be designed to have the same structure of that of the conventional correlator illustrated in FIG. 7.

That is, the first sub-correlator 101 may be designed to include a multiplier 201 (see FIG. 7) which multiplies an input signal by a pseudorandom noise code transmitted from a code generator which generates a pseudorandom noise code series selected by the code switch 104, chip by chip, an adder 202 which receives an output signal transmitted from the multiplier 201 and the previous latch output through input terminals, and adds them to each other, and a latch circuit 203 which latches an output transmitted from the adder 202. An output signal transmitted from the latch circuit 203 is fed back to the adder 202 through an input terminal. The first sub-correlator 101 outputs a correlation value calculated by successively multiplying M input signals by a pseudorandom code noise by means of the multiplier 201, and adding the products to one another in the adder 202.

The second sub-correlator 103 may be comprised of any correlator, if it had a function of detecting correlation between a predetermined number of correlation values read out of the memory 102 and a fixed word. In compliance with required performances, any correlator may be used as the second sub-correlator 103.

For instance, the conventional correlator illustrated in FIG. 7 or 8 may be used as the second sub-correlator 103, similarly to the first sub-correlator 101.

When the second sub-correlator is comprised of the correlator illustrated in FIG. 8, the fixed words Uk (k=0, 1, 2, - - -, K−1) are input into the K multipliers $303_1$ to $303_K$. When the second sub-correlator is comprised of the correlator illustrated in FIG. 7, the fixed words Uk (k=0, 1, 2, - - -, K−1) are input into the multiplier 201 as the coefficient Ci.

Hereinbelow is explained the correlator in accordance with the third embodiment.

The correlator in accordance with the third embodiment basically has the same structure as that of the correlator in accordance with the first embodiment, illustrated in FIG. 2, but is structurally different from the first embodiment in terms of the second sub-correlator.

Figure 6:
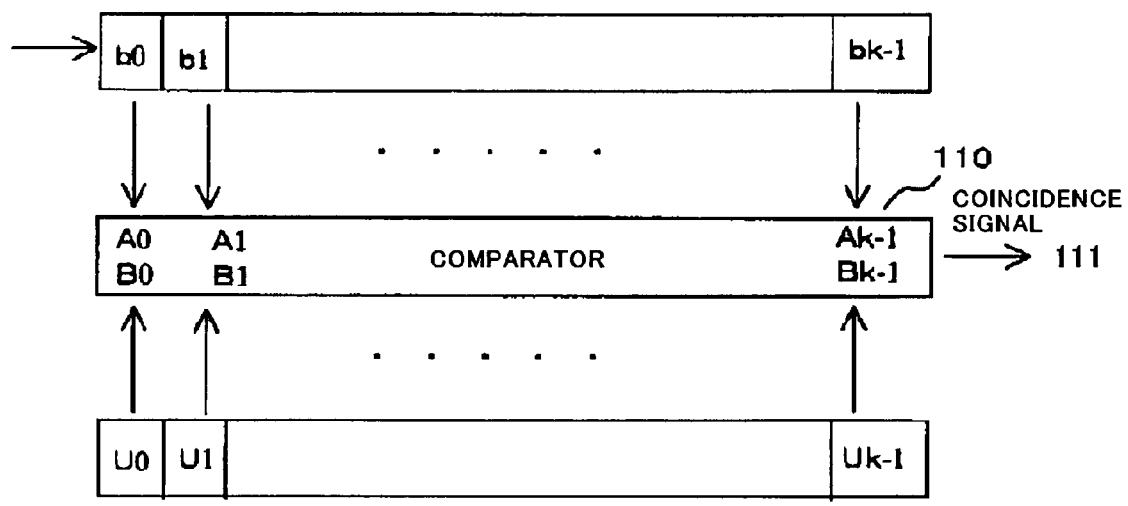
FIG. 6 is a block diagram of a correlator in accordance with still another embodiment of the present invention.

FIG. 6 is a partial block diagram of the correlator in accordance with the third embodiment.

If it is not necessary in the first embodiment illustrated in FIG. 2 to use a correlation value transmitted from the second sub-correlator 103, and it is only necessary to judge whether the correlation value and a fixed word are identical with each other, a comparator 110 which compares the correlation value 108 transmitted from the first sub-correlator 101, to a fixed word may be used in place of the second sub-correlator 103, as illustrated in FIG. 6.

Specifically, if it is not always necessary to have all correlation values, and it is only necessary to check whether a correlation value is identical with a synchronization pattern (frame synchronization pattern), the second sub-correlator 103 may be comprised of a digital comparator 110, as illustrated in FIG. 6.

The digital comparator 110 compares K correlation values $b_0$ to $b_{(K-1)}$ which are stored into the memory 102 from the first sub-correlator 101 and read out of the memory 102 by every L correlation values, to fixed words $U_0$ to $U_{(K-1)}$ to check whether they are coincident with each other, and transmits a coincidence signal 111, if they are coincident with each other.

The correlator having the above-mentioned structure, in accordance with the third embodiment, is suitable as a correlator used for detecting a synchronization pattern when a S/N ratio of a signal at an input terminal of a receiver is relatively small.

In each of the above-mentioned embodiments, the memory 102 was comprised of a dual port RAM in which a step of writing an address and a step of reading an address are carried out independently of each other with reference to writing and reading addresses, for the purpose of increasing an operation rate. However, it should be noted that the memory 102 is not to be limited to a dual port RAM, but may be comprised of an ordinary RAM having one input/output port.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 11-265040 filed on Sep. 20, 1999 including specification, claims, drawings and summary is incorporated herein by reference in its entirety.

What is claimed is:

1. A correlator that receives an input signal including a fixed pattern formed by spreading a predetermined number of symbols with pseudorandom noise code wherein the predetermined number of symbols comprises a fixed word, comprising:

a first sub-correlator; and a second sub-correlator, wherein said first sub-correlator detects correlation between said input signal and said pseudorandom noise code for one symbol length, wherein said second sub-correlator detects correlation between a correlation value output from said first sub-correlator and said fixed word for said predetermined number of symbols, wherein said second sub-correlator comprises a number of second sub-correlators, and wherein said number is determined in accordance with a number of different fixed words.

2. The correlator as set forth in claim 1, further comprising:

maximum detecting means for receiving an output transmitted from said plurality of second sub-correlators, and outputting a maximum signal for informing synchronous detection when a correlation value transmitted from each of said second sub-correlators comprises a maximum.

3. A correlator comprising:

a first sub-correlator that receives a fixed pattern including a code length N (N=M×K), as an input signal comprised of signals obtained by spreading a fixed word having a length of K, at a rate of M chips/symbol, and detects a correlation value between a k-th (0<k<K) symbol including an M chip length, among said fixed pattern, and pseudorandom noise code Sm, wherein m comprises an integer defined as k×M<m<((k+1)×M) and M and K comprise predetermined positive integers; and a second sub-correlator that receives data corresponding to K symbols, including a correlation value output from said first sub-correlator, and outputs a correlation value between said data and said fixed word, wherein said second sub-correlator comprises a number of second sub-correlators, and wherein said number is determined in accordance with a number of different fixed words.

4. A correlator comprising:

a first sub-correlator that receives a fixed pattern having a code length N (N=M×K), as an input signal comprised of signals obtained by spreading a fixed word having a length of K symbols, at a rate of M chips/symbol, and detects a correlation value between a k-th (0<k<K) symbol having a M chip length, among said fixed pattern, and pseudorandom noise code Sm, wherein m comprises an integer defined as k×M<m<((k+1)×M) and M and K comprise predetermined positive integers;

a memory that stores a predetermined number of correlation values per symbol, said correlation values being transmitted from said first sub-correlator and different in a phase from one another with respect to said input signal, and that stores correlation values substantially corresponding to K symbols; and a second sub-correlator that receives a data corresponding to K symbols, which is read from said memory for each of said predetermined number, and outputs a correlation value between said data and said fixed word.

5. The correlator as set forth in claim 4, wherein said second sub-correlator comprises a number of second sub-correlators, and wherein said number is determined in accordance with a number of different fixed words.

6. The correlator as set forth in claim 5, further comprising:

maximum detecting means for receiving an output transmitted from at least one of said plurality of second sub-correlators, and outputting a maximum signal for informing synchronous detection when a correlation value transmitted from one of said at least one of said plurality of said second sub-correlators comprises a maximum.

7. The correlator as set forth in claim 4, further comprising:

a code switch that switches said pseudorandom noise code for detecting correlation with said input signal.

8. The correlator as set forth in claim 4, wherein said correlation values being different in a phase from one another, comprise correlation values including phases different from one another by one or ½ chip.

9. The correlator as set forth in claim 4, wherein said memory comprises a dual port type random access memory.

10. A correlator which receives a fixed pattern having a code length N (N=M×K) which fixed pattern is obtained by spreading a fixed word having a length of K symbols, at a rate of M chips/symbol, comprising:

a first sub-correlator which receives said fixed pattern as an input signal, and detects a correlation value between a k-th (0<k<K) symbol including an M chip length, among said fixed pattern, and pseudorandom noise code Sm, wherein m comprises an integer defined as k×M<m<((k+1)×M) and M and K comprise predetermined positive integers;

a memory that stores a predetermined number (L) of correlation values per symbol, said correlation values being transmitted from said first sub-correlator and different in a phase from one another with respect to said input signal, and that stores L×K correlation values substantially corresponding to K symbols;

a reading-address controller that outputs a reading-address for reading data corresponding to K symbols from said memory for each of said L correlation values; and a second sub-correlator that receives said data corresponding to K symbols, which is read from said memory for each of said L correlation values, and outputs a correlation value between said data and said fixed word.

11. The correlator as set forth in claim 10, further comprising:

a writing-address controller that outputs a writing-address, wherein a correlation value output from said first sub-correlator is written into an address in said memory, said address being designated by said writing-address controller.

12. The correlator as set forth in claim 10, wherein said second sub-correlator comprises a number of second sub-correlators, and wherein said number is determined in accordance with a number of different fixed words.

13. The correlator as set forth in claim 12, further comprising:
maximum detecting means for receiving an output transmitted from at least one of said plurality of second sub-correlators, and outputting a maximum signal for informing synchronous detection when a correlation value transmitted from one of said at least one of said plurality of said second sub-correlators comprises a maximum.

14. The correlator as set forth in claim 10, further comprising:
a code switch that switches said pseudorandom noise code for detecting correlation with said input signal.

15. The correlator as set forth in claim 10, wherein said correlation values being different in a phase from one another, comprise correlation values including phases different from one another by one or ½ chip.

16. The correlator as set forth in claim 10, wherein said memory comprises a dual port type random access memory.

17. A correlator comprising:
a first sub-correlator that receives a fixed pattern having a code length N (N=M×K), as an input signal comprised of signals obtained by spreading a fixed word having a length of K symbols, at a rate of M chips/symbol, and detects a correlation value between a k-th (0<k<K) symbol including an M chip length, among said fixed pattern, and pseudorandom noise code Sm, wherein m comprises an integer defined as k×M<m<((k+1)×M) and M and K comprise predetermined positive integers;
a memory that stores a predetermined number of correlation values per symbol, said stored correlation values being transmitted from said first sub-correlator and different in a phase from one another with respect to said input signal, and that stores correlation values substantially corresponding to K symbols; and
a comparator that compares K stored correlation values transmitted from said first sub-correlator to said fixed word to check whether they are coincident with each other.

18. A correlator which receives a fixed pattern having a code length N (N=M×K), wherein the fixed pattern is obtained by spreading a fixed word having a length of K symbols at a rate of M chips/symbol, comprising:
a first sub-correlator which receives said fixed pattern as an input signal, and detects a correlation value between a k-th (0<k<K) symbol including an M chip length, among said fixed pattern, and pseudorandom noise code Sm, wherein m comprises an integer defined as k×M<m<((k+1)×M) and M and K comprise predetermined positive integers;
a memory that stores a predetermined number (L) of correlation values per symbol, said stored correlation values being transmitted from said first sub-correlator and different in a phase from one another with respect to said input signal, and that stores L×K correlation values substantially corresponding to K symbols;
a reading-address controller that outputs a reading-address for reading data corresponding to K symbols from said memory for each of said L correlation values; and
a comparator that compares K stored correlation values transmitted from said first sub-correlator to said fixed word to check whether they are coincident with each other.

19. A CDMA (Code Division Multiple Access) communication device including a correlator which receives an input signal including a fixed pattern formed by spreading a predetermined number of symbols comprising a fixed word, with pseudorandom noise code, comprising:
a first sub-correlator of said correlator; and
a second sub-correlator of said correlator,
wherein said first sub-correlator detects correlation between said input signal and said pseudorandom noise code for one symbol length, and
wherein said second sub-correlator detects correlation between a correlation value output from said first sub-correlator and said fixed word for said predetermined number of symbols,
wherein said second sub-correlator comprises a number of second sub-correlators, and
wherein said number is determined in accordance with a number of different fixed words.

20. A CDMA (Code Division Multiple Access) communication device including a correlator comprising:
a first sub-correlator that receives a fixed pattern including a code length N (N=M×K), as an input signal comprised of signals obtained by spreading a fixed word having a length of K symbols, at a rate of M chips/symbol, and detects a correlation value between a k-th (0<k×<K) symbol including an M chip length, among said fixed pattern, and pseudorandom noise code Sm, wherein m comprises an integer defined as k×M<m<((k+1)×M) and M and K comprise positive integers; and
a second sub-correlator that receives data corresponding to K symbols, including a correlation value output from said first sub-correlator, and outputs a correlation value between said data and said fixed word,
wherein said second sub-correlator comprises a number of second sub-correlators, and wherein said number is determined in accordance with a number of different fixed words.

21. A CDMA (Code Division Multiple Access) communication device including a correlator comprising:
a first sub-correlator that receives a fixed pattern having a code length N (N=M×K), as an input signal comprised of signals obtained by spreading a fixed word having a length of K symbols, at a rate of M chips/symbol, at a rate of M chips/symbol, and detects a correlation value between a k-th (0<k<K) symbol including an M chip length, among said fixed patterns, and pseudorandom noise code Sm, wherein m comprises an integer defined as k×M<m<((k+1)×M) and M and K comprise predetermined positive integers;
a memory that stores a predetermined number of correlation values per symbol, said correlation values being transmitted from said first sub-correlator and different in a phase from one another with respect to said input signal, and that stores correlation values substantially corresponding to K symbols; and
a second sub-correlator that receives data corresponding to K symbols, which is read from said memory for each said predetermined number, and outputs a correlation value between said data and said fixed word.

22. A CDMA (Code Division Multiple Access) communication device including a correlator that receives a fixed pattern having a code length N (N=M××K), said fixed pattern being obtained by spreading a fixed word having a length of K symbols at a rate of M chips/symbol,
said correlator comprising:
a first sub-correlator having a correlation value between a k-th (0<k<K) symbol having a M chip length, among said fixed pattern, and pseudorandom noise code Sm, wherein m comprises an integer defined as k×M<m< ((k+1)×M) and M and K comprise predetermined positive integers;

a memory that stores a predetermined number (L) of correlation values per symbol, said correlation values being transmitted from said first sub-correlator and different in a phase from one another with respect to said input signal, and that stores L×K correlation values substantially corresponding to K symbols;

a reading-address controller that outputs a reading-address for reading data corresponding to K symbols from said memory for each of said L correlation values; and a second sub-correlator that receives said data corresponding to K symbols, which is read from said memory for each of said L correlation values, and outputs a correlation value between said data and said fixed word.

23. A spread spectrum type communication device comprising a correlator that performs synchronization capture,
said correlator comprising:
a first sub-correlator that detects correlation between an input signal and pseudorandom noise code for inverse-spreading said input signal having been spectrum-spread; and
a second sub-correlator that detects correlation between a predetermined number of correlation outputs transmitted from said first sub-correlator and a synchronization pattern,
wherein said second sub-correlator comprises a number of second sub-correlators, and
wherein said number is determined in accordance with a number of different fixed words.

24. A spread spectrum communication device comprising a correlator that performs synchronization capture,
said correlator comprising:
a first sub-correlator that detects correlation between an input signal and pseudorandom noise code for inverse-spreading said input signal having been spectrum-spread; and
a second sub-correlator comprising a number of second sub-correlators,
wherein said number is determined in accordance with a number of different fixed words, and
wherein said second sub-correlator includes a comparator that compares a predetermined number of correlation outputs transmitted from said first sub-correlator to a synchronization pattern for checking whether they are coincident with each other.

25. A correlator comprising:
a first sub-correlator; and
a second sub-correlator,
wherein said first sub-correlator receives an input signal including a fixed pattern formed by spreading a predetermined number of symbols with pseudorandom noise code, said symbols including a fixed word,
wherein said first sub-correlator detects correlation between said input signal and said pseudorandom noise code for one symbol length and outputs a first correlation value, and
wherein said second sub-correlator detects correlation between said first correlation value and said fixed word for said predetermined number of symbols and outputs a second correlation value,
wherein said second sub-correlator comprises a number of second sub-correlators, and
wherein said number is determined in accordance with a number of different fixed words.

26. A correlator comprising:
a first sub-correlator; and
a second sub-correlator,
wherein said first sub-correlator receives a fixed pattern including a code length N, as an input signal comprised of signals obtained by spreading a fixed word including a length of K symbols, at a rate of M chips/symbol,
wherein said first sub-correlator detects a correlation value between a k-th symbol including an M chip length, among said fixed pattern, and pseudorandom noise code $S_m$,
wherein said second sub-correlator receives data corresponding to K symbols, including a correlation value output from said first sub-correlator, and outputs a correlation value between said data and said fixed word,
wherein N=M×K, M and K comprise predetermined positive integers, 0<k<K, and m comprises an integer defined as k×M<m<((k+1)×M),
wherein said second sub-correlator comprises a number of second sub-correlators, and
wherein said number is determined in accordance with a number of different fixed words.

27. The correlator as set forth in claim 26, further comprising:
a memory,
wherein said memory stores a predetermined number of correlation values per a symbol, said correlation values being transmitted from said first sub-correlator and different in a phase from one another with respect to said input signal, and
wherein said memory stores correlation values substantially corresponding to K symbols.

28. The correlator as set forth in claim 27, wherein said second sub-correlator reads from said memory for each of said predetermined number.

29. The correlator as set forth in claim 27, further comprising:
a writing-address controller that outputs a writing-address,
wherein a correlation value output from said first sub-correlator is written into an address in said memory, said address being designated by said writing-address controller.

30. The correlator as set forth in claim 26, further comprising:
means for receiving an output transmitted from at least one of said plurality of second sub-correlators and outputting a maximum signal for informing synchronous detection when a correlation value transmitted from one of said at least one of said plurality of said second sub-correlators comprises a maximum.

31. A correlator comprising:
means for receiving an input signal including a fixed pattern formed by spreading a predetermined number of symbols with pseudorandom noise code, said symbols including a fixed word, detecting correlation between said input signal and said pseudorandom noise code for one symbol length, and outputting a first correlation value;
means for detecting correlation between said first correlation value and said fixed word for said predetermined number of symbols and outputting a second correlation value, and
means for receiving said second correlation value, said means comprising a number of second sub-correlators, wherein said number is determined in accordance with a number of different fixed words.

32. A correlator comprising:

means for receiving an input signal including a fixed pattern including a code length N, said input signal comprising signals obtained by spreading a fixed word including a length of K symbols, at a rate of M chips/symbol, and detecting a correlation value between a k-th symbol including an M chip length, among said fixed pattern, and pseudorandom noise code Sm, and means for receiving data corresponding to K symbols, including a correlation value output from a first sub-correlator, and outputting a correlation value between said data and said fixed word, wherein N=M×K, M and K comprise predetermined positive integers, 0<k<K, and m comprises an integer defined as k×M<m<((k+1)×M), wherein said means for receiving data comprises a number of second sub-correlators, and wherein said number is determined in accordance with a number of different fixed words.

33. A correlator that detects correlation for data including a predetermined length, comprising:

a plurality of sub-correlators, wherein each of the sub-correlators comprises a length equal to a divisor of the predetermined length, and wherein a correlation value output from one of the plurality of sub-correlators is received by another of the plurality of sub-correlators disposed downstream of the one of the plurality of sub-correlators, and wherein a number of said plurality of sub-correlators is determined in accordance with said divisor of said predetermined length.

* * * * *